United States Patent
Schmidt et al.

(10) Patent No.: US 11,578,756 B2
(45) Date of Patent: Feb. 14, 2023

(54) GANTRY ASSEMBLY BEARING WITH ANNULAR DAMPER

(71) Applicant: AKTIEBOLAGET SKF, Gothenburg (SE)

(72) Inventors: William D. Schmidt, Muskegon, MI (US); Parveen K. Chandila, Tomball, TX (US)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/362,180

(22) Filed: Jun. 29, 2021

(65) Prior Publication Data
US 2022/0412405 A1 Dec. 29, 2022

(51) Int. Cl.
F16C 33/58 (2006.01)
F16C 35/06 (2006.01)
F16C 19/52 (2006.01)

(52) U.S. Cl.
CPC .......... *F16C 33/583* (2013.01); *F16C 19/527* (2013.01); *F16C 33/586* (2013.01); *F16C 35/06* (2013.01)

(58) Field of Classification Search
CPC ...... F16C 27/066; F16C 33/60; F16C 33/583; F16C 33/586; F16C 35/06; F16C 2226/60; F16C 19/527; F16C 33/768; F16C 35/077; A61B 6/035; F16B 5/0241; F16B 5/0258; F16B 13/0841; F16B 37/125; F16F 1/3732; F16F 1/3735; F16F 1/38; F16F 15/08
See application file for complete search history.

(56) References Cited

U.S. PATENT DOCUMENTS

| 6,337,894 | B1 | 1/2002 | Tybinkowski et al. |
| 6,367,980 | B1 * | 4/2002 | Kobayashi ............... F16C 33/60 384/537 |
| 7,441,960 | B2 | 10/2008 | Brandenstein et al. |
| 2015/0285308 | A1 * | 10/2015 | Kanamoto ............ F16C 33/605 384/504 |
| 2017/0210165 | A1 * | 7/2017 | Kawamura ............. F16C 35/06 |
| 2020/0096041 | A1 * | 3/2020 | Wojtyczka ............ F01D 25/162 |

OTHER PUBLICATIONS

Unpublished U.S. Appl. No. 17/144,263.

* cited by examiner

*Primary Examiner* — Alan B Waits
(74) *Attorney, Agent, or Firm* — J-Tek Law PLLC; Scott T. Wakeman; Mark A. Ussai (57) ABSTRACT

A gantry assembly includes a rotor rotatable about a central axis, a stator fixed with respect to the axis and a bearing inner ring connected with the rotor and having an outer circumferential surface providing a least one inner raceway and two opposing axial end. A bearing outer ring is disposed about the inner ring and has an inner circumferential surface providing at least one outer raceway, first and second axial ends, an annular recess extending axially inwardly from the first axial end, and a plurality of threaded mounting holes extending axially-inwardly from the recess and spaced circumferentially about the central axis. An annular damper is disposed within the recess and a plurality of threaded fasteners each extend from the stator, through the damper and into a separate one of the plurality of threaded mounting holes to connect the bearing outer ring with the stator.

20 Claims, 9 Drawing Sheets

GANTRY ASSEMBLY BEARING WITH ANNULAR DAMPER

BACKGROUND OF THE INVENTION

The present invention relates to bearings, and more particularly to rolling element bearings for gantry assemblies.

Gantry assemblies for machines such as luggage security scanners, CT scanners, radiotherapy machines, etc. typically include a stationary frame with a central opening for receiving a patient or an object being scanned and a rotatable assembly with diagnostic, scanning or/and treatment devices which scan or radiate the object (e.g., a piece of luggage) or patient within the frame opening. Typically, the rotatable assembly is connected with the frame by a bearing assembly, such as a thin section bearing.

SUMMARY OF THE INVENTION

In one aspect, the present invention is a gantry assembly comprising a rotor rotatable about a central axis and a stator fixed with respect to the axis. A bearing inner ring is connected with the rotor and has an outer circumferential surface providing a least one inner raceway and two opposing axial ends. A bearing outer ring is disposed about the inner ring and has an inner circumferential surface providing at least one outer raceway and first and second axial ends. An annular recess extends axially inwardly from the first axial end and a plurality of threaded mounting holes extend axially-inwardly from the recess and are spaced circumferentially about the central axis. An annular damper is disposed within the recess and a plurality of threaded fasteners each extend from the stator, through the damper and into a separate one of the plurality of threaded mounting holes to connect the bearing outer ring with the stator.

Preferably, the annular damper is formed of a plurality of damper arcuate sections disposed within the outer ring recess and spaced circumferentially about the central axis, each damper arcuate section being disposed between a separate pair of adjacent mounting holes. As such, each fastener extends through a gap between adjacent ends of two damper arcuate sections. Alternatively, the damper may be provided by a one-piece annular elastomeric plate disposed within the annular recess of the bearing outer ring and having a plurality of through-holes through which the fasteners extend.

In another aspect, the present invention is a bearing assembly for a gantry assembly, the gantry assembly including a rotor rotatable about a central axis and a stator fixed with respect to the axis. The bearing comprises a bearing inner ring connectable with the rotor and having an outer circumferential surface providing a least one inner raceway and two opposing axial ends and a bearing outer ring disposed about the inner ring. The bearing outer ring has an inner circumferential surface providing at least one outer raceway, first and second axial ends, an annular recess extending axially inwardly from the first axial end, and a plurality of mounting means extending axially-inwardly from the recess and spaced circumferentially about the central axis. An annular damper is disposed within the recess and each mounting means is configured to receive a separate one of a plurality of fasteners so as to connect the bearing outer ring with the stator.

In another aspect, the present invention is again a gantry assembly comprising a rotor rotatable about a central axis and a stator fixed with respect to the axis. A bearing inner ring is connected with the rotor and has an outer circumferential surface providing a least one inner raceway and two opposing axial ends. A bearing outer ring is disposed about the inner ring and has an inner circumferential surface providing at least one outer raceway, first and second axial ends and an annular recess extending axially inwardly from first axial end. The recess is defined by a radially-extending base surface, an axially-extending inner shoulder surface and an axially-extending outer shoulder surface spaced radially outwardly from the inner shoulder surface. A plurality of threaded mounting holes extend axially-inwardly from the recess base surface and are spaced circumferentially about the central axis. An annular damper is disposed within the recess and has a first axial end disposed against the recess base surface, a second axial end disposed against the stator, an inner radial end disposed against the recess inner shoulder surface and an outer radial end disposed against the recess outer shoulder surface, the damper being formed of a plurality of arcuate sections spaced circumferentially about the central axis. Further, a plurality of threaded fasteners each extend from the stator, through the damper and threadably engage with a separate one of the plurality of mounting holes such that the damper is compressed between the stator and the base surface of the recess.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-9 a gantry assembly 10 basically comprising a rotor 12 (FIG. 1) rotatable about a central axis $A_C$, a stator 14 fixed with respect to the axis $A_C$ and a bearing assembly 16 rotatably coupling the rotor 12 with the stator 14. Preferably, the gantry assembly 10 is part of a luggage security scanner including a rotatable drum (not shown) connected with the rotor 12, on which are mounted various imaging or scanning equipment, and a support frame (not shown) connected with the stator 14, the details of which are beyond the scope of the present disclosure. However, the gantry assembly 10 may be incorporated into a "CT" scanner (i.e., computed tomography scanner), a radiation treatment machine (e.g., external beam radiotherapy) or any other machine or device for rotating imaging or treatment equipment, or any other appropriate devices, about a central axis.

Figure 1:
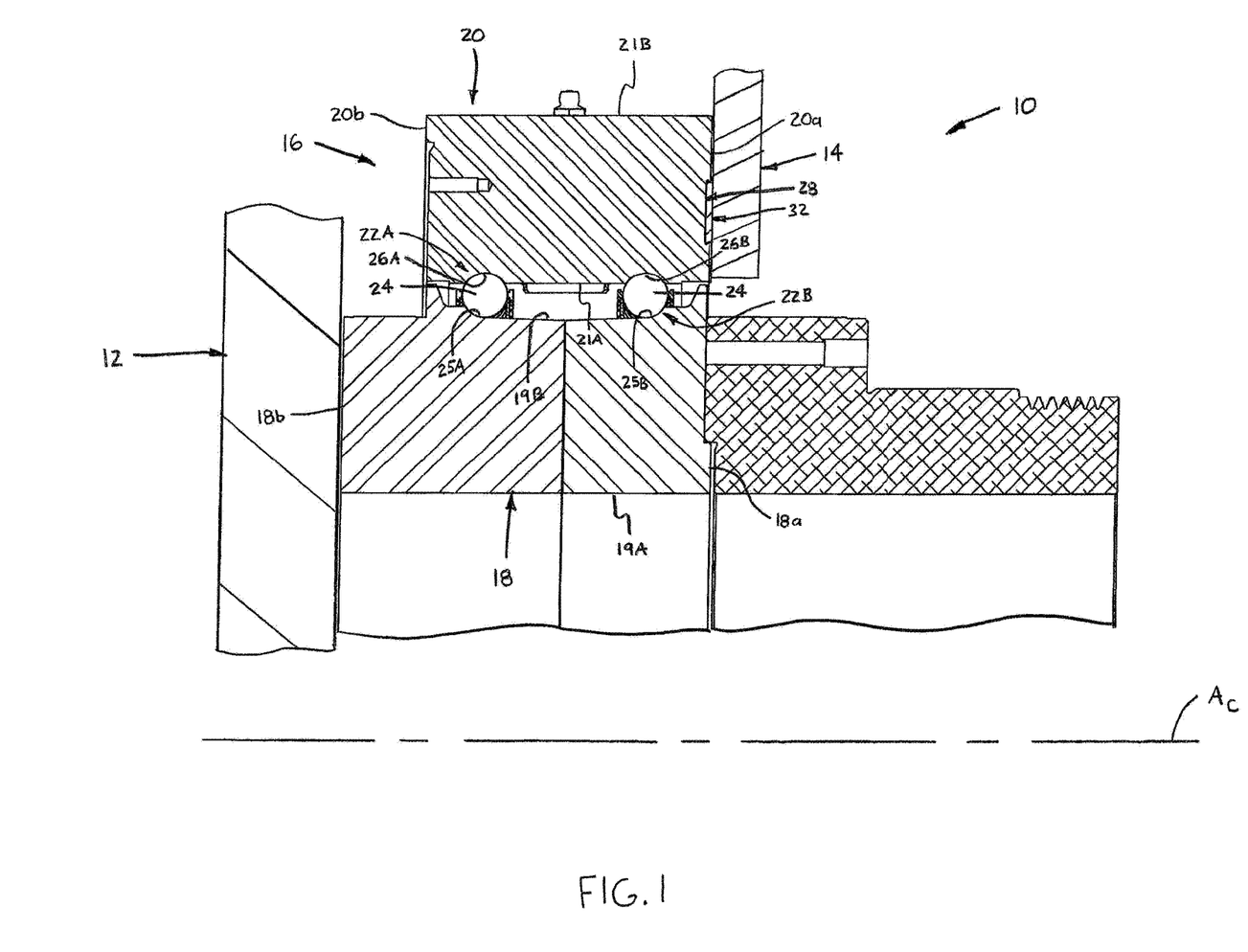
FIG. 1 is broken-away, axial cross-sectional view of the present gantry assembly.
Figure 2:
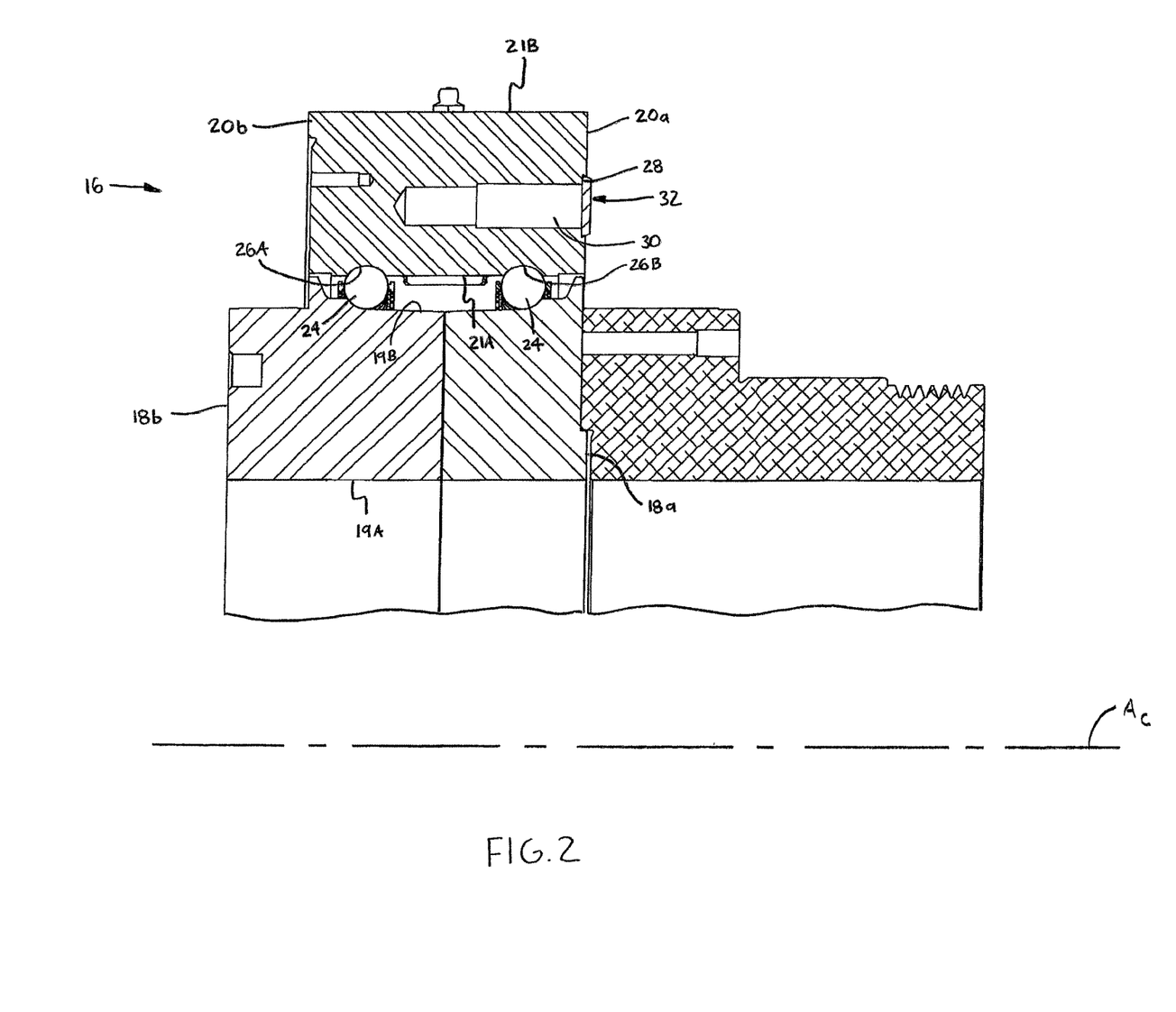
FIG. 2 is a broken-away, axial cross-sectional view of a bearing assembly of the present gantry assembly.
Figure 3:
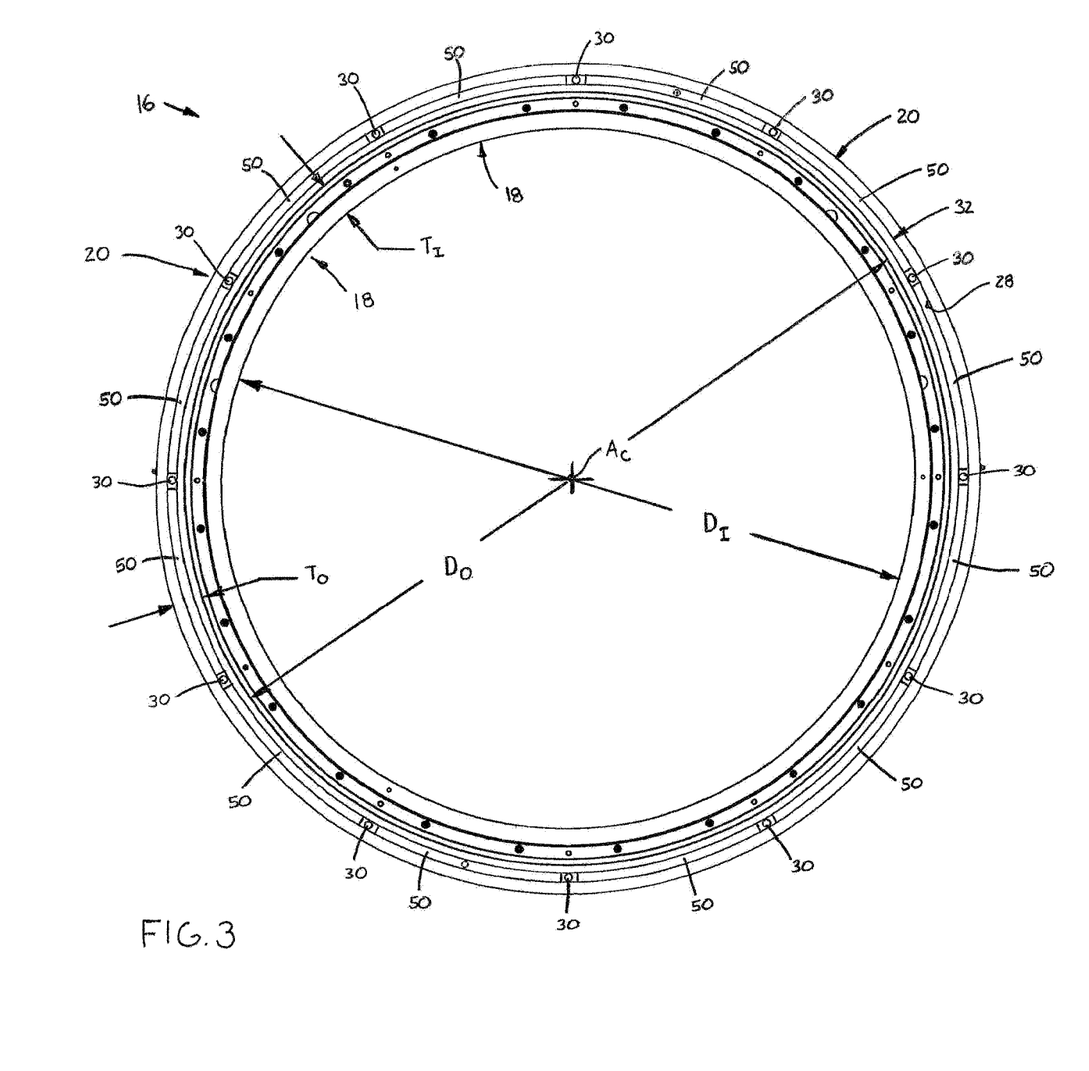
FIG. 3 is a side plan view of the bearing assembly.

As best shown in FIGS. 1-4, the bearing assembly 16 includes a bearing inner ring 18 connected with the rotor 12, a bearing outer ring 20 disposed about the inner ring 18 and connected or connectable with the stator 14 and at least one and preferably two sets 22A, 22B of rolling elements 24 disposed between the inner and outer rings 18, 20. Preferably, the bearing assembly 16 is a "thin section bearing" having relatively diametrically large and "thin" inner and outer rings 18, 20 such that a ratio of a diameter $D_I$ of the inner ring 18 to a radial thickness $T_I$ of the inner ring 18, i.e. $D_I/T_I$, as well as a ratio of a diameter $D_O$ of the outer ring 24 to a radial thickness $T_O$ of the outer ring 20, i.e. $D_O/T_O$, is each greater than fifteen (15), and preferably greater than twenty (20), as indicated in FIG. 3. As such, the preferred bearing assembly 16 has a degree of flexibility that causes the assembly 16 to be relatively sensitive to the effects of vibration. However, the bearing assembly 16 may instead be formed in any other appropriate manner, such for example, having relatively thick or stiff inner and outer rings 18, 20, etc.

More specifically, the bearing inner ring 18 has an inner circumferential surface 19A, an opposing outer circumferential surface 19B providing at least one and preferably two raceways 25A, 25B, and two opposing axial ends 18a, 18b. Further, the bearing outer ring 20 has an inner circumferential surface 21A providing at least one and preferably two outer raceways 26A, 26B, an opposing outer circumferential surface 21B, a first axial end 20a and a second axial end 20b. An annular recess 28 extends axially inwardly from the first axial end 20a of the outer ring 20 and a plurality of threaded mounting holes 30 extend axially-inwardly from the recess 28 and are spaced circumferentially about the central axis $A_C$.

Furthermore, an annular damper 32 is disposed within the recess 28 and is formed of a vibration absorbent material, preferably natural rubber, EPDM rubber, neoprene or silicone, but may be formed of any other appropriate material. A plurality of fasteners 34 (FIG. 6), which are preferably threaded rods, each extend from the stator 14, through the damper 32 and into a separate one of the plurality of threaded mounting holes 30 to connect the bearing outer ring 20 with the stator 14. Specifically, the stator 14 has a first axial end 14a disposed adjacent to or against the first axial end 20a of the bearing outer ring 1, an opposing second axial end 14b and plurality of counterbore openings 15 (one shown) extending between the first and second axial ends 14a, 14, each opening 15 having an annular shoulder surface 15a facing generally toward the second axial end 14b. With this structure, each fastener 34 preferably has a head 35 disposed against the counterbore shoulder surface 15a such that rotation of the fastener 34 in a first (preferably clockwise) direction clamps the stator 14 against the bearing outer ring 20 (either directly or through the damper 32) and preferably compresses the damper 32 between the recess 28 and the stator 14.

By providing the bearing assembly 16 with the damper 32, the transfer of vibration from the outer ring 20 to the connected stator 14 is substantially reduced and preferably substantially eliminated. Such vibration within the outer ring 20 is generated by rotation of the inner ring 18 and the rolling elements 24, and if transferred to the stator 14, can lead to damage to (or even failure of) the stator 14 or/and any components supported thereby. As such, the annular damper 32 solves a common problem of previously known gantry assemblies that include thin section bearings. Having described the basic elements above, these and other components of the present gantry assembly 10 are described in further detail below.

Referring to FIGS. 5-8, the annular recess 28 of the bearing outer ring 20 is preferably defined by a base surface 40 and inner and outer shoulder surfaces 42, 44, respectively, with the mounting holes 30 extending axially-inwardly from the base surface 40. Specifically, the base surface 40 is spaced axially from the first axial end 20a of the outer ring 20, is generally radially-extending and has inner and outer radial ends 40a, 40b, respectively. The inner shoulder surface 42 extends axially from the inner end 40a of the base surface 40 to the first axial end 20a of the bearing outer ring 20 and preferably extends circumferentially entirely about the central axis $A_C$ (i.e., as a continuous outer circumferential surface). Further, the outer shoulder surface 44 is spaced radially outwardly from, and generally faces, the inner shoulder surface 42 and extends axially between the base surface outer end 40b and the outer ring first axial end 20a, and also extends circumferentially entirely about the central axis $A_C$. Also, the recess 28 has an axial depth $d_R$ (FIG. 8) defined between the outer ring first axial end 20a and the base surface 40, as discussed in further detail below.

Preferably, the inner shoulder surface 42 of the recess 28 is angled radially outwardly from the base surface 40 to the first axial end 20a of the bearing outer ring 20. Similarly, the recess outer shoulder surface 44 is angled radially inwardly from the base surface 40 to the first axial end 20a of the bearing outer ring 20. As such, the recess 28 has generally trapezoidal axial cross-sections and the angled shoulder surfaces 42, 44 function to interlock with complementary surfaces of the damper 32 as described below, to thereby retain the damper 32 within the recess 28. However, the inner and outer shoulder surfaces 42, 44 may alternatively extend substantially "straight" or in a direction substantially parallel with the central axis $A_C$ (structure not shown).

Figure 5:
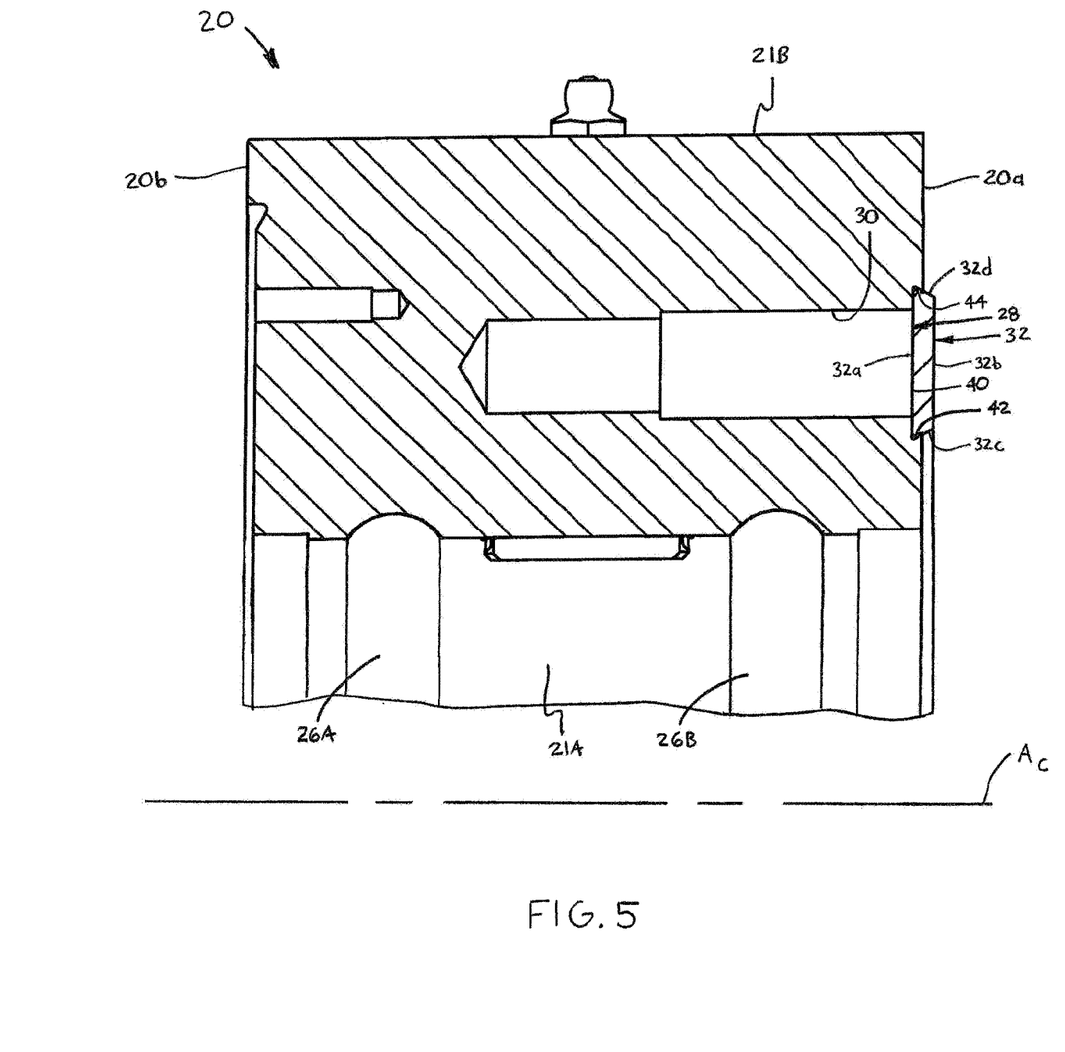
FIG. 5 is an enlarged, broken-away axial cross-sectional view of an outer ring of the bearing assembly.
Figure 6:
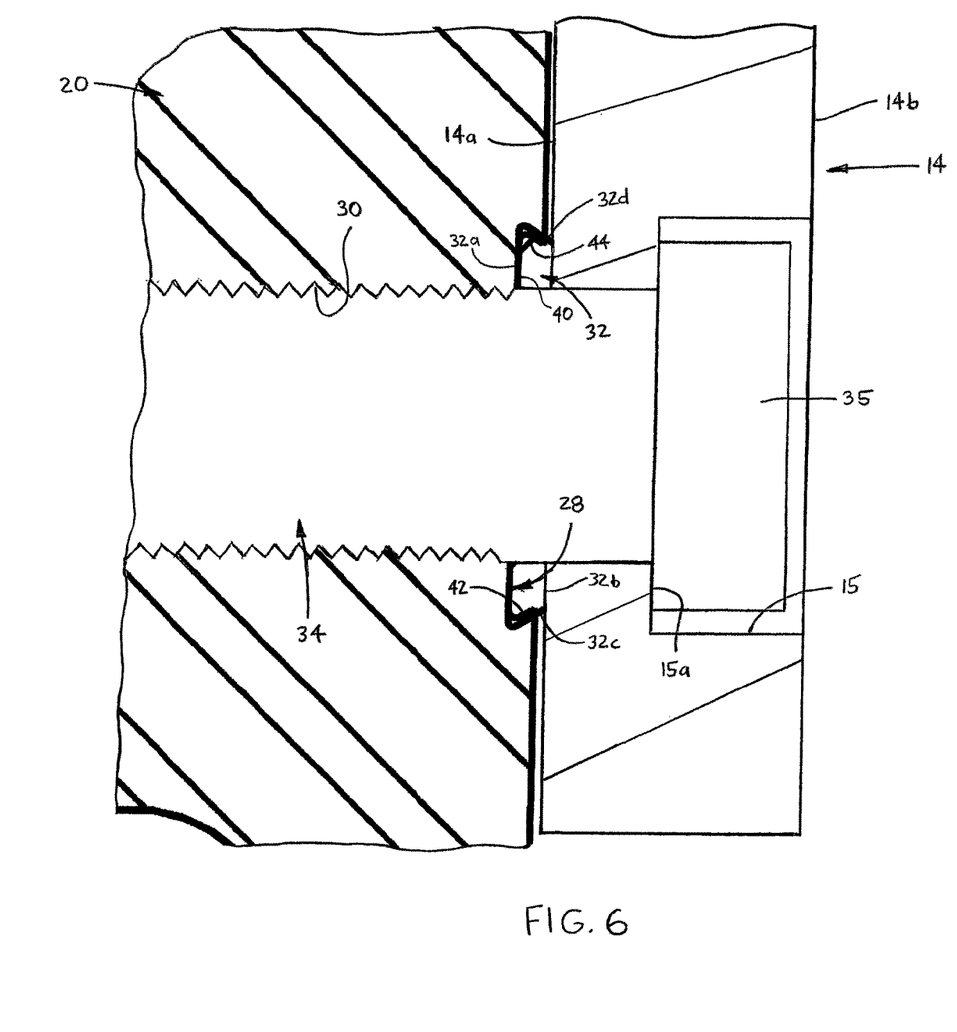
FIG. 6 is a more enlarged, broken-away axial cross-sectional view of the bearing outer ring taken through a section having a mounting hole and shown connected with a stator.
Figure 7:
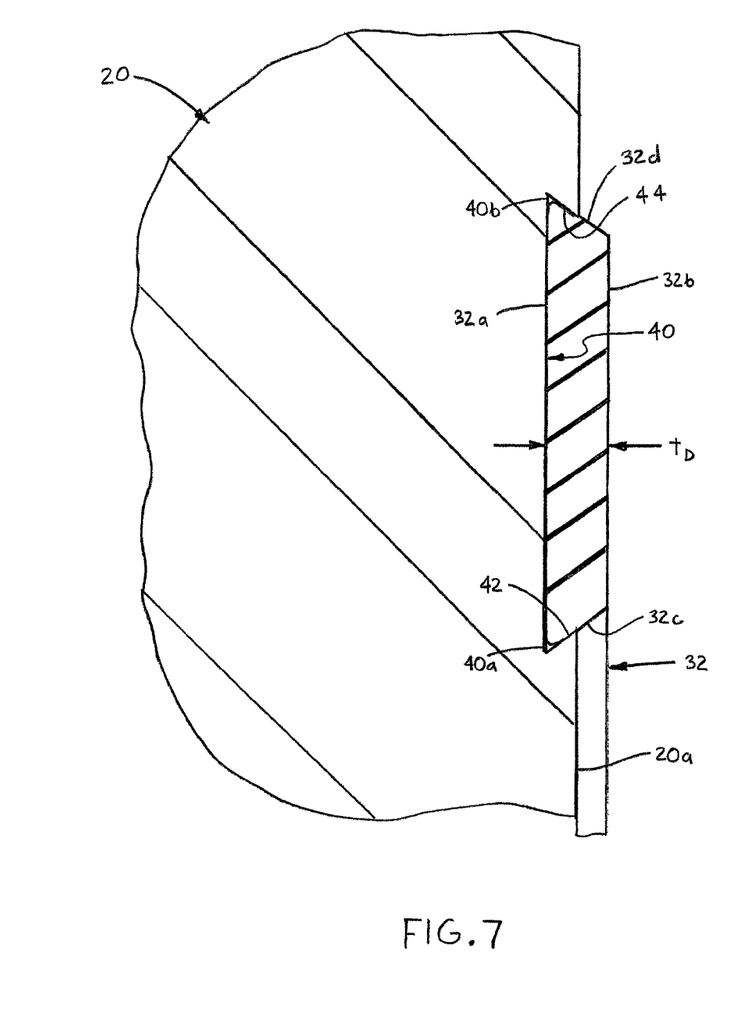
FIG. 7 is a more enlarged, broken-away axial cross-sectional view of the bearing outer ring taken through a section without a mounting hole.
Figure 8:
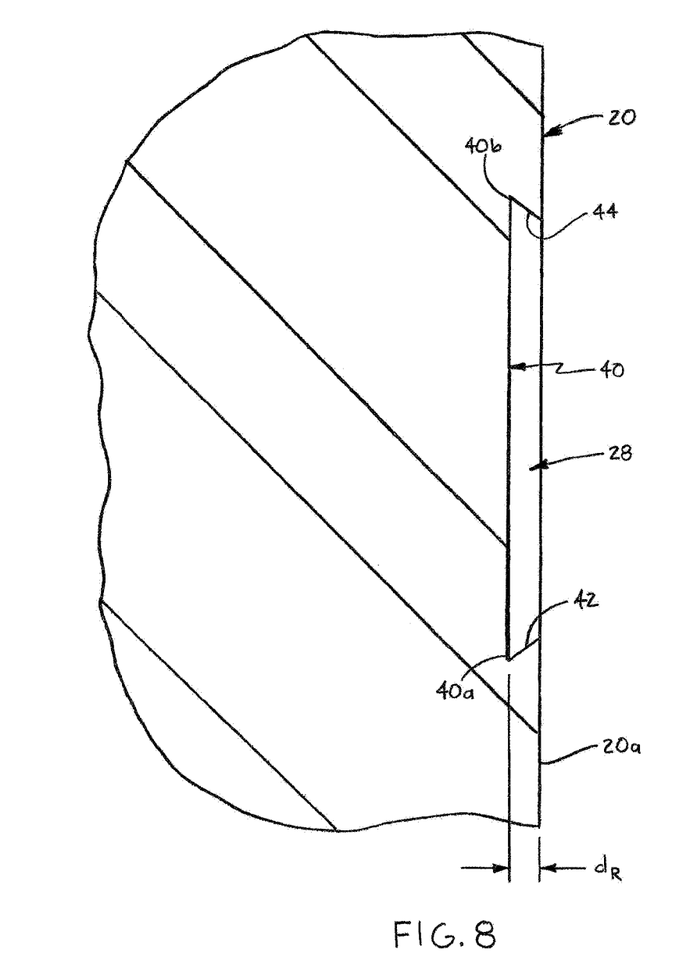
FIG. 8 is another view of FIG. 7, shown without a damper.

Referring to FIGS. 5 and 7, the annular damper 32 has a first axial end 32a, an opposing second axial end 32b, and inner and outer radial ends 32c, 32d, respectively. The damper first axial end 32a is disposed against the recess base surface 40 and the second axial end 32b is disposed (or disposeable) against the stator 14, i.e., disposed against when the bearing assembly 16 is installed in the gantry assembly 10. Also, the damper 32 has an axial thickness $t_D$ (FIG. 7) defined between the damper first and second axial ends 32a, 32b, respectively, and the damper 32 is preferably sized such that axial thickness $t_D$ of the damper 32 is greater than the axial depth $d_R$ of the recess 28. As such, the damper 32 projects axially outwardly from the recess 28 (i.e. beyond the outer ring axial end 20a) when the bearing outer ring 20 is unconnected with the stator 14 and is compressed between the recess base surface 40 and the stator 14 when the outer ring 28 is connected with the stator 14.

Further, the damper inner radial end 32c is disposed against the recess inner shoulder surface 42 and the damper outer radial end 32b is disposed against the recess outer shoulder surface 44. To interlock with the recess shoulder surfaces 42, 44 as described above, the damper 32 is preferably formed such that the damper inner radial end 32c is angled radially outwardly in a direction from the damper first axial end 32a to the damper second axial end 32b and the damper outer radial end 32d is angled radially inwardly from the damper first axial end 32a to the damper second axial end 32b. As such, the damper 32 has generally trapezoidal axial cross-sections and the recess inner and outer shoulder surfaces 42, 44 wedge against the corresponding surfaces 33A, 33B of the damper 32 to axially retain the damper 32 within the recess 28.

However, particularly if the shoulder surfaces 42, 44 are formed substantially straight as described above, the damper inner and outer ends 32a, 32b may likewise be alternatively formed generally axially "straight" and the damper 32 retained within the recess 28 by other means, such as an adhesive. In any case, some means to retain the damper 32 within the recess 28 are preferred in order to prevent separation during transport of the bearing assembly 16 for final assembly with the rotor 12 and stator 14.

Figure 4:
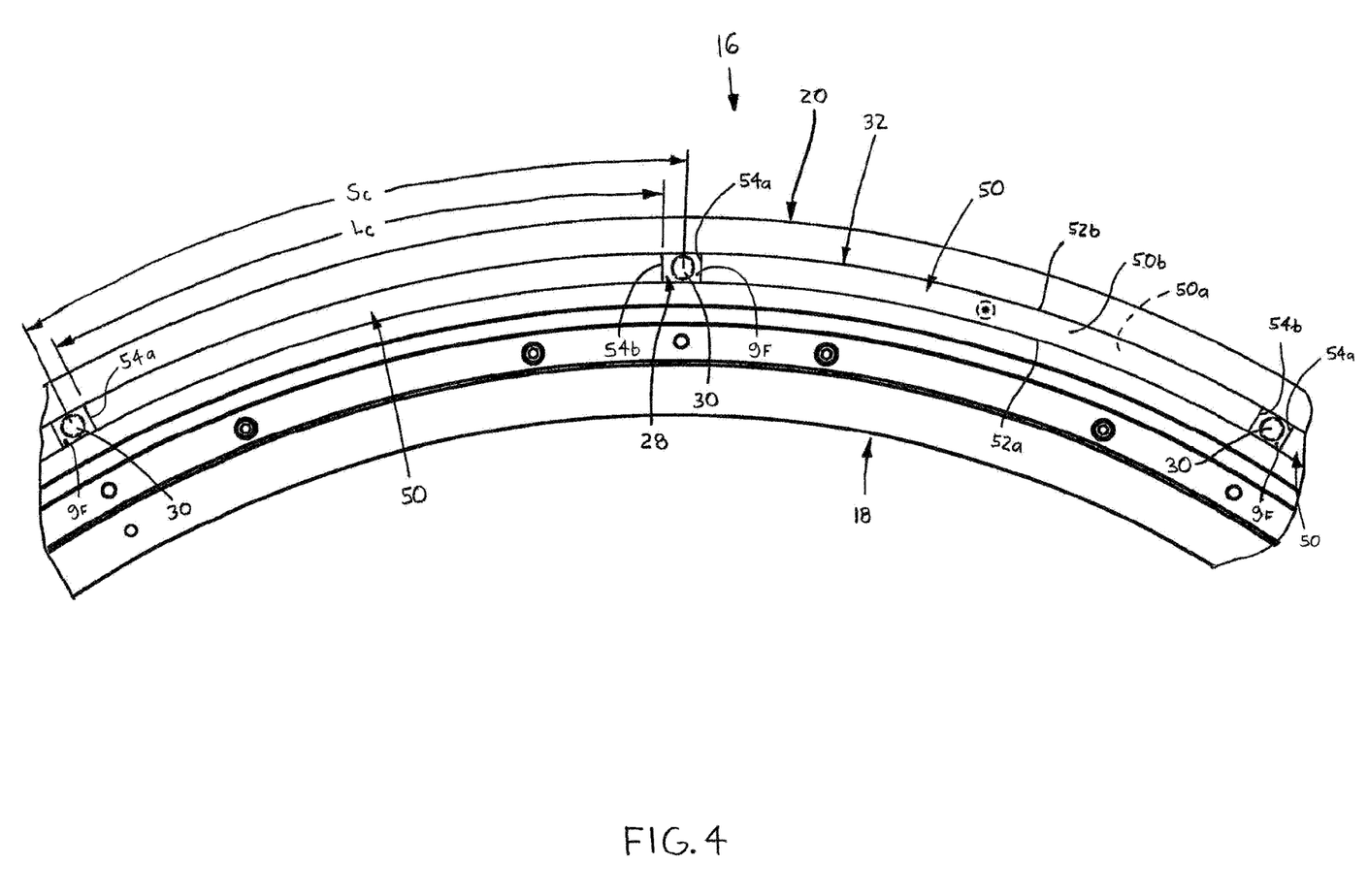
FIG. 4 is a broken-away, enlarged view of a portion of the FIG. 3.

As best shown in FIGS. 3 and 4, the damper 32 is preferably formed of a plurality of damper arcuate sections 50 spaced circumferentially about the central axis $A_C$. Each damper arcuate section 50 has a circumferential length $L_C$ that is less than a circumferential spacing distance $S_C$ between each pair of adjacent mounting holes 30 of the bearing outer ring 20. More specifically, the damper arcuate sections 50 each have a first axial end 50a, an opposing second axial end 50b, an inner radial end 52a, an outer radial end 52b, and two opposing circumferential ends 54a, 54b. Collectively, the first axial ends 50a of the damper arcuate sections 50 provide the damper first axial end 32a, the second axial ends 50b of the damper arcuate sections 50 provide the damper second axial end 32, the inner radial ends 52a of the damper arcuate sections 50 provide the damper inner radial end 32c and the outer radial ends 52b of the damper arcuate sections 50 provide the damper outer radial end 32d.

Further, with this "segmented" damper structure, an arcuate free space or gap $g_F$ (FIG. 4) is defined between the ends 50a, 50b of each adjacent pair of damper arcuate sections 50 and is generally centered about one of the mounting holes 30. As such, the plurality of fasteners 34 each extend through the damper 32 by passing axially through one of the gaps $g_F$ and into the proximal mounting hole 30. Also, each arcuate section 50 may be fabricated as an arcuate or curved strip when separate from the bearing outer ring 20 or may be provided by a rectangular strip that is formed into an arcuate shape when installed within the recess 28.

Figure 9:
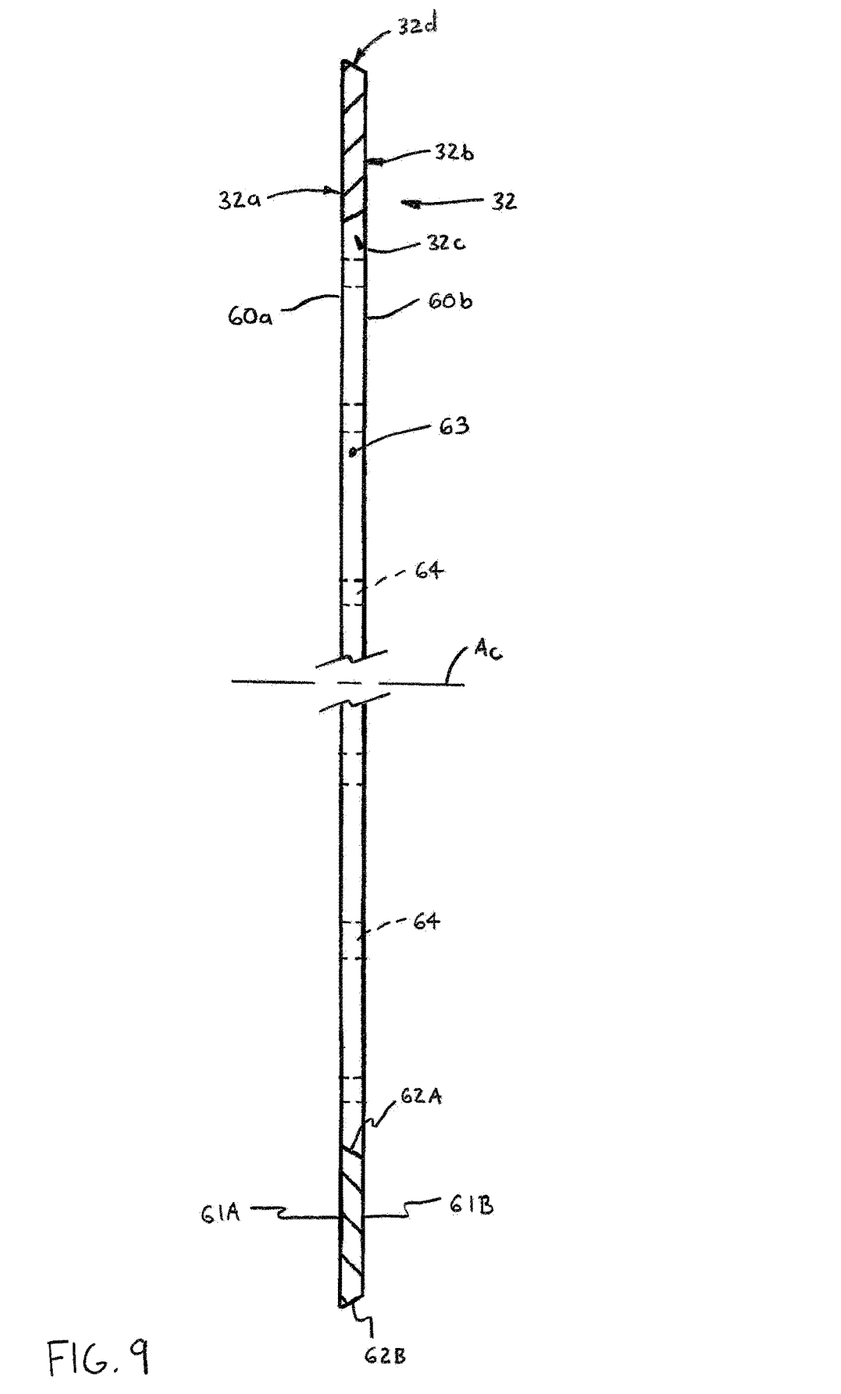
FIG. 9 is an axial cross-sectional view of an alternative, one-piece damper shown separate from the bearing outer ring.

Alternatively, as depicted in FIG. 9, the damper 32 may be formed as a single or one-piece, generally annular plate 60 having a first axial end 60a with a planar surface 61A, a second axial end 50b with an opposing planar surface 61B, an inner circumferential surface 62A defining a central opening 63 and an opposing outer circumferential surface 62B. A plurality of through-holes 64 extend between the inner axial and outer axial ends 60a, 60b, respectively, each through hole 64 being angularly and radially aligned with a separate one of the threaded mounting holes 30 of the bearing outer ring 20. Further, the annular plate 60 preferably has generally frustoconical or trapezoidal axial cross-sections as depicted to provide the angled inner and outer ends 32a, 32b as described above, but may alternatively have generally rectangular cross-sections if formed with straight ends 32a, 32b.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A gantry assembly comprising:
 a rotor rotatable about a central axis;
 a stator fixed with respect to the axis;
 a bearing inner ring connected with the rotor and having an outer circumferential surface providing a least one inner raceway and two opposing axial ends;
 a bearing outer ring disposed about the inner ring and having an inner circumferential surface providing at least one outer raceway, first and second axial ends, an annular recess extending axially inwardly from the first axial end and circumferentially entirely about the central axis, and a plurality of threaded mounting holes extending axially-inwardly from the recess and spaced circumferentially about the central axis;
 an annular damper disposed within the recess; and
 a plurality of threaded fasteners, each fastener extending from the stator, through the damper and into a separate one of the plurality of threaded mounting holes to connect the bearing outer ring with the stator.

2. The gantry assembly as recited in claim 1 wherein:
 the recess is defined by a radially-extending base surface, an axially-extending inner shoulder surface and an axially-extending outer shoulder surface spaced radially outwardly from the inner shoulder surface, the mounting holes extending axially-inwardly from the recess base surface; and the damper has a first axial end disposed against the recess base surface, a second axial end disposed against the stator, an inner radial end disposed against the recess inner shoulder surface and an outer radial end disposed against the recess outer shoulder surface.

3. The gantry assembly as recited in claim 2 wherein:
the recess base surface has an inner radial end and an outer radial end;
the recess inner shoulder surface extends axially from the inner radial end of the base surface; and
the recess outer shoulder surface extends axially from the outer radial end of the base surface.

4. The gantry assembly as recited in claim 2 wherein:
the inner shoulder surface of the recess is angled radially outwardly from the base surface to the first axial end of the bearing outer ring and the outer shoulder surface of the recess is angled radially inwardly from the base surface to the first axial end of the bearing surface; and
the damper inner radial end is angled radially outwardly from the damper first axial end to the damper second axial end and is disposed against the inner shoulder surface of the recess and the damper outer radial end is angled radially inwardly from the damper first axial end to the damper second axial end and is disposed against the outer shoulder surface of the recess such that the inner shoulder surface and the outer shoulder surface axially retain the damper within the recess.

5. The gantry assembly as recited in claim 1 wherein:
the damper is formed as a plurality of arcuate sections spaced circumferentially about the central axis, each damper arcuate section having a first axial end, a second axial end, an inner radial end, an outer radial end and two opposing circumferential ends, each damper arcuate section being disposed within the outer ring recess between each pair of adjacent mounting holes; or
the damper is formed as an annular plate having a first axial end, a second axial end, an inner circumferential surface defining a central opening and an outer circumferential surface, and a plurality of through-holes extending between the inner axial end and the outer axial end, each through hole being angularly and radially aligned with a separate one of the threaded mounting holes of the bearing outer ring.

6. The gantry assembly as recited in claim 1 wherein the annular recess has trapezoidal axial cross-sections.

7. The gantry assembly as recited in claim 1 wherein:
the recess of the bearing outer ring has a radially-extending base surface and an axial depth defined between the first axial end of the bearing outer ring and the base surface; and
the damper has a first axial end, a second axial end and an axial thickness defined between the damper first axial end and the damper second axial end, the axial thickness of the damper being greater than the axial depth of the recess such that the damper projects axially outwardly from the recess when the bearing outer ring is unconnected with the stator and is compressed between the recess base surface and the stator when the outer ring is connected with the stator.

8. The gantry assembly as recited in claim 1 wherein:
the stator has a first axial end disposed against or adjacent to the first axial end of the bearing outer ring, an opposing second axial end and plurality of counterbore openings extending between the first and second axial ends, each opening having an annular shoulder surface facing toward the second axial end; and
each fastener has a head disposed against the counterbore shoulder surface such that rotation of the fastener in a first direction clamps the stator against the bearing outer ring and compresses the damper between the recess and the stator.

9. The gantry assembly as recited in claim 1 wherein the damper is formed of natural rubber, EPDM rubber, neoprene or silicone.

10. The gantry assembly as recited in claim 1 wherein the bearing is a thin section bearing in which a ratio of a diameter of the inner ring to a radial thickness of the inner ring and a ratio of a diameter of the outer ring to a radial thickness of the outer ring is each greater than fifteen (15).

11. A bearing assembly for a gantry assembly, the gantry assembly including a rotor rotatable about a central axis and a stator fixed with respect to the axis, the bearing assembly comprising:
a bearing inner ring connectable with the rotor and having an outer circumferential surface providing a least one inner raceway and two opposing axial ends;
a bearing outer ring disposed about the inner ring and having an inner circumferential surface providing at least one outer raceway, first and second axial ends, an annular recess extending axially inwardly from the first axial end and circumferentially entirely about the central axis, and a plurality of threaded mounting holes extending axially-inwardly from the recess and spaced circumferentially about the central axis; and
an annular damper disposed within the recess;
wherein each threaded mounting hole is configured to receive a separate one of a plurality of fasteners so as to connect the bearing outer ring with the stator.

12. The bearing assembly as recited in claim 11 wherein a ratio of a diameter of the inner ring to a radial thickness of the inner ring and a ratio of a diameter of the outer ring to a radial thickness of the outer ring is each greater than fifteen (15).

13. The bearing assembly as recited in claim 11 wherein the damper is formed of natural rubber, EPDM rubber, neoprene or silicone.

14. The bearing assembly as recited in claim 11 wherein each fastener is a threaded rod configured to threadably engage with a separate one of the mounting holes.

15. The bearing assembly as recited in claim 11 wherein:
the damper is formed as a plurality of arcuate sections spaced circumferentially about the central axis, each damper arcuate section having a first axial end, a second axial end, an inner radial end, an outer radial end and two opposing circumferential ends, each damper arcuate section being disposed within the outer ring recess between each pair of adjacent mounting holes; or
the damper is formed as a annular plate having a first axial end, a second axial end, an inner circumferential surface defining a central opening and an outer circumferential surface, and a plurality of through-holes extending between the inner axial end and the outer axial end, each through hole being angularly and radially aligned with a separate one of the threaded mounting holes of the bearing outer ring.

16. The bearing assembly as recited in claim 15 wherein each damper arcuate section has a first axial end, a second axial end, an inner radial end, an outer radial end and two opposing circumferential ends, each damper arcuate section being disposed within the outer ring recess between each pair of adjacent mounting holes.

17. The bearing assembly as recited in claim 11 wherein:
the recess is defined by a radially-extending base surface, an axially-extending inner shoulder surface and an axially-extending outer shoulder surface spaced radially outwardly from the inner shoulder surface, the mounting holes extending axially-inwardly from the recess base surface; and the damper has a first axial end disposed against the recess base surface, a second axial end disposeable against the stator, an inner radial end disposed against the recess inner shoulder surface and an outer radial end disposed against the recess outer shoulder surface.

18. The bearing assembly as recited in claim 17 wherein:
the inner shoulder surface of the recess is angled radially outwardly from the base surface to the first axial end of the bearing outer ring and the outer shoulder surface of the recess is angled radially inwardly from the base surface to the first axial end of the bearing surface; and the damper inner radial end is angled radially outwardly from the damper first axial end to the damper second axial end and is disposed against the inner shoulder surface of the recess and the damper outer radial end is angled radially inwardly from the damper first axial end to the damper second axial end and is disposed against the outer shoulder surface of the recess such that the inner shoulder surface and the outer shoulder surface axially retain the damper within the recess.

19. The bearing assembly as recited in claim 11 wherein:
the recess of the bearing outer ring has a radially-extending base surface and an axial depth defined between the first axial end of the bearing outer ring and the base surface; and the damper has a first axial end, a second axial end and an axial thickness defined between the damper first axial end and the damper second axial end, the axial thickness of the damper being greater than the axial depth of the recess such that the damper projects axially outwardly from the recess when the bearing outer ring is unconnected with the stator and is compressed between the recess base surface and the stator when the outer ring is connected with the stator.

20. A gantry assembly comprising:
a rotor rotatable about a central axis;
a stator fixed with respect to the axis; and
a bearing inner ring connected with the rotor and having an outer circumferential surface providing a least one inner raceway and two opposing axial ends;
a bearing outer ring disposed about the inner ring and having an inner circumferential surface providing at least one outer raceway, first and second axial ends, an annular recess extending axially inwardly from first axial end and circumferentially entirely about the central axis, the recess being defined by a radially-extending base surface extending circumferentially about the central axis, an axially-extending inner shoulder surface extending circumferentially about the central axis and an axially-extending outer shoulder surface spaced radially outwardly from the inner shoulder surface and extending circumferentially about the central axis, and a plurality of threaded mounting holes extending axially-inwardly from the recess base surface and spaced circumferentially about the central axis;
an annular damper disposed within the recess and having a first axial end disposed against the recess base surface, a second axial end disposed against the stator, an inner radial end disposed against the recess inner shoulder surface and an outer radial end disposed against the recess outer shoulder surface, the damper being formed of a plurality of arcuate sections spaced circumferentially about the central axis; and
a plurality of threaded fasteners, each fastener extending from the stator, through the damper and threadably engaged with a separate one of the plurality of mounting holes such that the damper is compressed between the stator and the base surface of the recess.

* * * * *